A. F. SMITH.

Apparatus for Drying Shoe-Soles.

No. 6,362. Reissued March 30, 1875.

Witnesses.

Sam^l M. Barton

A. E. Denison

Inventor

Aaron F. Smith.

by his Attys.

Carroll D. Wright & Power

UNITED STATES PATENT OFFICE.

AARON F. SMITH, OF LYNN, MASS., ASSIGNOR, BY MESNE ASSIGNMENTS, TO LYMAN A. MAY, AMOS E. WITHEY, AND HENRY L. DRAKE.

IMPROVEMENT IN APPARATUS FOR DRYING SHOE-SOLES.

Specification forming part of Letters Patent No. 123,585, dated February 13, 1872; reissue No. 6,362, dated March 30, 1875; application filed January 20, 1875.

*To all whom it may concern:*

Be it known that I, AARON F. SMITH, of Lynn, in the county of Essex and State of Massachusetts, have invented certain new and useful Improvements in Apparatus for Drying Shoe-Soles; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
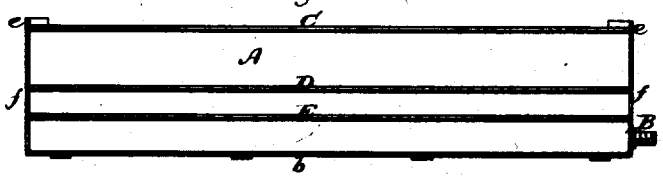
Figure 2:
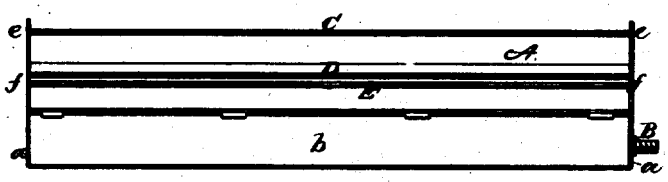
Figure 3:
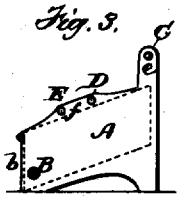

Figure 1 is a top view. Fig. 2 is a front elevation. Fig. 3 is an end view, and Fig 4 a longitudinal section.

In drying boot or shoe soles for being buffed by a buffing wheel or machine, it has been the practice heretofore to place the boots or shoes in a drying room or chamber, and submit them to the desiccating powers of heated air contained therein.

By this process the heat is necessarily applied to the whole boot or shoe, and, as a consequence, it frequently happens that the sole, or the heel, or both, becomes warped or cracked, and the upper more or less injured.

My invention has for its object to obviate this difficulty by drying only the lower surface of the boot or shoe sole sufficiently to admit of the buffing operation, leaving the rest of the sole and boot or shoe to be dried slowly and properly in the atmosphere.

To this end my invention consists of a box or case, preferably portable, heated by suitable means, and adapted to support on its upper side any desired number of boots or shoes in such manner as to subject only the lower surfaces of their soles to the drying action of the heated box, the remaining portions of the boots or shoes being unaffected, as I will now proceed to describe.

Figure 4:
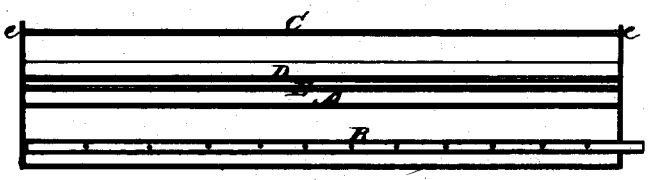

In carrying out my invention, I employ a case or box, A, of suitable size, shape, and material, giving preference in shape to a prism whose section transversely is an inclined parallelogram. B is a tube, adapted to convey a suitable heating medium into the box A. In the present instance I employ gas as a heating medium, and for this purpose I extend the tube B into the box and perforate said tube, as shown in Fig. 4, the box being provided with an imperforate top, and an opening, *a*, having a door, *b*, for the admission of air to support combustion.

The outer end of the tube B may be coupled with a flexible or rigid tube or conduit, to lead the heating medium into the box.

C D E represent rails arranged on the top of the box A, and supported by standards *e e f f* projecting up from the box. The two front rails D E are disposed at a short distance from the top of the box, the back-rail C being elevated higher, as shown in Fig. 3.

The rail C serves to support the boots or shoes at their heels, which hang on it, while the soles rest on the rails D E.

The boots or shoes to be dried are placed on the rails in the manner described, or in any suitable manner which will bring the bottoms of the soles in close proximity to the heating-surface. A suitable heating medium being introduced into the box through the pipe B, the heat is radiated upward against the bottoms of the soles, which are rapidly dried thereby.

This apparatus, simple as it is, has been found to be of great advantage, as it can be placed on the bench of a workman, close to the buffing wheel or machine; and if made large enough to support a dozen pairs of boots or shoes, each may be dried to the extent necessary for buffing, fresh boots or shoes being put in the place of those removed. It saves the expense of drying-rooms, and the labor of transporting the boots or shoes thereto and removing them therefrom, as well as the care and attention necessary to effect their proper drying. It also avoids the cracking and other injury done to the leather, sole, or heel by the drying-room. It enables the boot or shoe to be buffed while in a heated state, whereby the buffing can be done to greater advantage, and saves all glazing of the boot or shoe, which frequently takes place when the boots or shoes are dried by the old process. The racks or rails keep the boot or shoe out of contact with the top of the box, thereby preventing the sole from being burned or scorched, besides giving the heat free access to all parts of the bottom of the sole. The apparatus enables boot and shoe soles to be dried more expeditiously than by the use of the hot room or chamber.

I claim—

The portable box or case A, provided with heating apparatus, as shown, and a raised or elevated rack for supporting a boot or shoe, substantially as and for the purpose described.

In testimony that I claim the foregoing I have hereunto set my hand this 8th day of January, 1875.

AARON F. SMITH.

Witnesses:

A. F. L. NORRIS,

TRUE L. NORRIS.